United States Patent
Hwang

(10) Patent No.: US 6,358,355 B1
(45) Date of Patent: Mar. 19, 2002

(54) METHOD FOR MANUFACTURING A ROLL TOP

(75) Inventor: James Hwang, Taipei (TW)

(73) Assignee: Kenmark Industrial Co., Ltd., Taipei (TW)

( * ) Notice: Subject to any disclaimer, the term of this patent is extended or adjusted under 35 U.S.C. 154(b) by 0 days.

(21) Appl. No.: 09/407,081

(22) Filed: Sep. 28, 1999

(30) Foreign Application Priority Data

Mar. 17, 1999 (TW) ........................................ 88104092 A

(51) Int. Cl.[7] ........................... B32B 31/00; B25B 25/00
(52) U.S. Cl. ........................ 156/285; 156/297; 156/299; 312/297
(58) Field of Search ................................. 156/297, 298, 156/299, 552, 285, 286, 245; 264/571; 220/350; 312/297; 160/133, 231.2

(56) References Cited

U.S. PATENT DOCUMENTS

| | | | | |
|---|---|---|---|---|
| 1,815,558 A | * | 7/1931 | Gammeter | 156/298 |
| 2,690,216 A | * | 9/1954 | Scott | 160/201 |
| 4,052,241 A | * | 10/1977 | Walter | 156/285 |
| 5,494,181 A | * | 2/1996 | Denney | 217/62 |

* cited by examiner

*Primary Examiner*—Sam Chuan Yao
*Assistant Examiner*—Todd J. Kilkenny
(74) *Attorney, Agent, or Firm*—Dougherty & Troxell

(57) ABSTRACT

A method for manufacturing a roll top is disclosed, in which solid wood strips are arranged equidistant apart in a mold. Then glue is applied to the same side of the strips. Then a wood texture rubber sheet is covered onto strips on the side having glue. Then the mold is vacuumed, causing the rubber sheet to completely adheres to the strips. A roll top of the present invention is then fabricated in this manner, which is a simple, rapid and low cost manufacturing method for roll tops.

2 Claims, 1 Drawing Sheet

METHOD FOR MANUFACTURING A ROLL TOP

FIELD OF THE INVENTION

The present invention relates to a method for manufacturing a roll top, and especially to a roll top used in the curved sliding door for closed cases (containers, shoe cabinets, etc.)

DESCRIPTION OF THE PRIOR ART

A flexible roll top can cover the curved opening of a case. The prior art roll top is made of long solid wood strips. Each wood strip undergoes the process of painting and polishing repeatedly at least three to seven times (each painting is followed by a polishing, the number of such repetitions depends on the degree of quality required). Then the wood strips are arranged in array with equal distance apart. Glue is applied to same side of the wood, and then a cloth covers over the wood strips on the side with glue, and is thermally pressed thereon. A roll top is fabricated in this manner. In this method for manufacturing a roll top, because it must undergo repeated processes of polishing and painting, the manufacturing process is onerous and time consuming, and the cost is thus increased. Furthermore, thirty minutes are required to adhere the cloth to the wood strips, which time is excessive. As such the manufacturing method for the prior art roll top poses drawbacks to be improved upon. Although plastic has been used as material to manufacture strips by injection, thus rendering the painting and polish unnecessary, however, the plastic strips can not be made to show the beautiful color of wood texture, and appear as black color. Therefore, they can not complement the color of wood cases. Accordingly, the plastic roll tops have not fare well in the consumer market.

SUMMARY OF THE INVENTION

Aiming to improve on the onerous manufacturing process, high costs and having the popular color of wood texture, drawbacks associated with prior art roll top, in the present invention, the solid wood strips are arranged in array and equidistant apart in mold. Then glue is applied to the same side of the long strips, and a wood texture rubber sheet then covers onto each strip on the glued side. Then the mold is vacuumed, causing the rubber sheet to completely adheres to the strips. This then completes the manufacturing process for roll top of the present invention, which is simple, rapid and low cost.

BRIEF DESCRIPTION OF THE DRAWINGS

The present invention will be better understood and its numerous objects and advantages will become apparent to those skilled in the art by referencing to the following drawings in which.

DESCRIPTION OF THE PREFERRED EMBODIMENT

Figure 1:
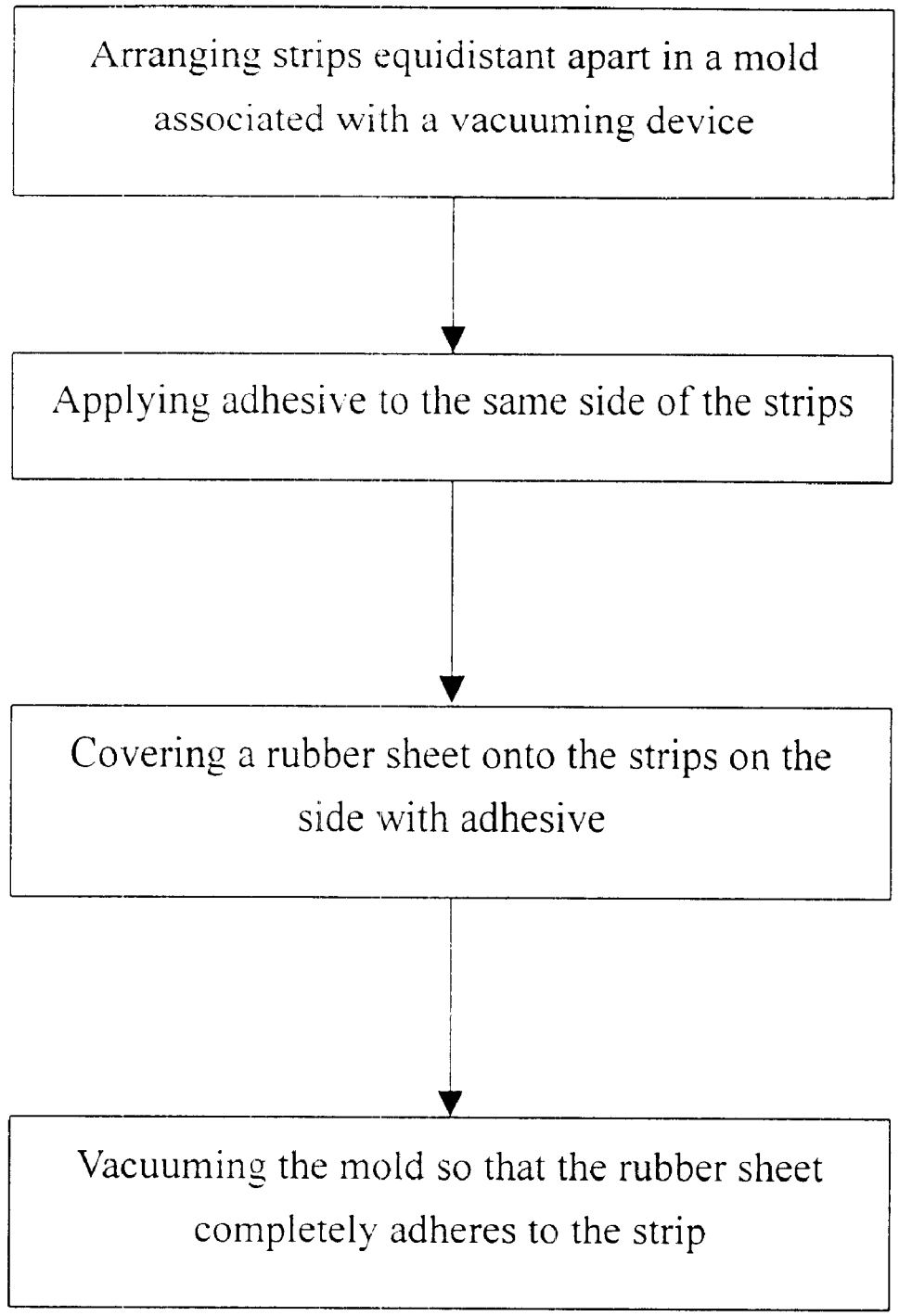
FIG. 1 is a flow chart of the present invention.

Referring to FIG. 1, the strips employed in the present invention can be made either of solid woods or plastic. A plurality of long strips are arrayed equidistant apart in a mold connected to a vacuum machine. Glue is applied to the same side of the strips. Then wood texture rubber sheet (preferably a hard rubber sheet with a thickness of 0.35 mm, not easily torn up) covers the long strips on the glued side. The mold is then vacuumed, causing the rubber sheet to completely adhere to the strips. As the rubber sheet lies across the gaps between two long strips, slack curved packets are formed so that the roll top becomes flexible. In this manner, a roll top is made pursuant to the present invention.

The manufacturing process of the present invention is simple, rapid and low cost. The adhesion between the rubber sheet and the strips is superb. As the rubber sheet covers the outer surface of the roll top, the wood texture color of the sheet can complement the wood texture color of cases. So that even if black strips made by plastic injection are selected, the black color will not be seen. In this manner, so as not to disrupt the uniformity in the colors. As a matter of fact, the color of the rubber sheet in the present invention is not confined to the wood texture color; it should have various colors to complement the colors of cases to which they are installed. Although certain preferred embodiment of the present invention has been shown and described in detail, it should be understood that various changes and modification may be made therein without departing from the scope of the appended claims.

What is claimed is:

1. A method of manufacturing a roll top, comprising the steps of:

a) placing a plurality of equidistantly spaced apart strips in a mold having a vacuum device;

b) applying adhesive to a same side of all of the plurality of strips;

c) placing a rubber sheet in contact with the sides of the plurality of strips having the adhesive; and, d) drawing a vacuum through the mold subsequent to placing the rubber sheet in contact with the plurality of strips to completely adhere the rubber sheet to the plurality of strips.

2. The method of claim 1 comprising the additional step of providing a rubber sheet having a wood texture prior to placing the rubber sheet into contact with the plurality of strips.

* * * * *